United States Patent Office 3,565,606
Patented Feb. 23, 1971

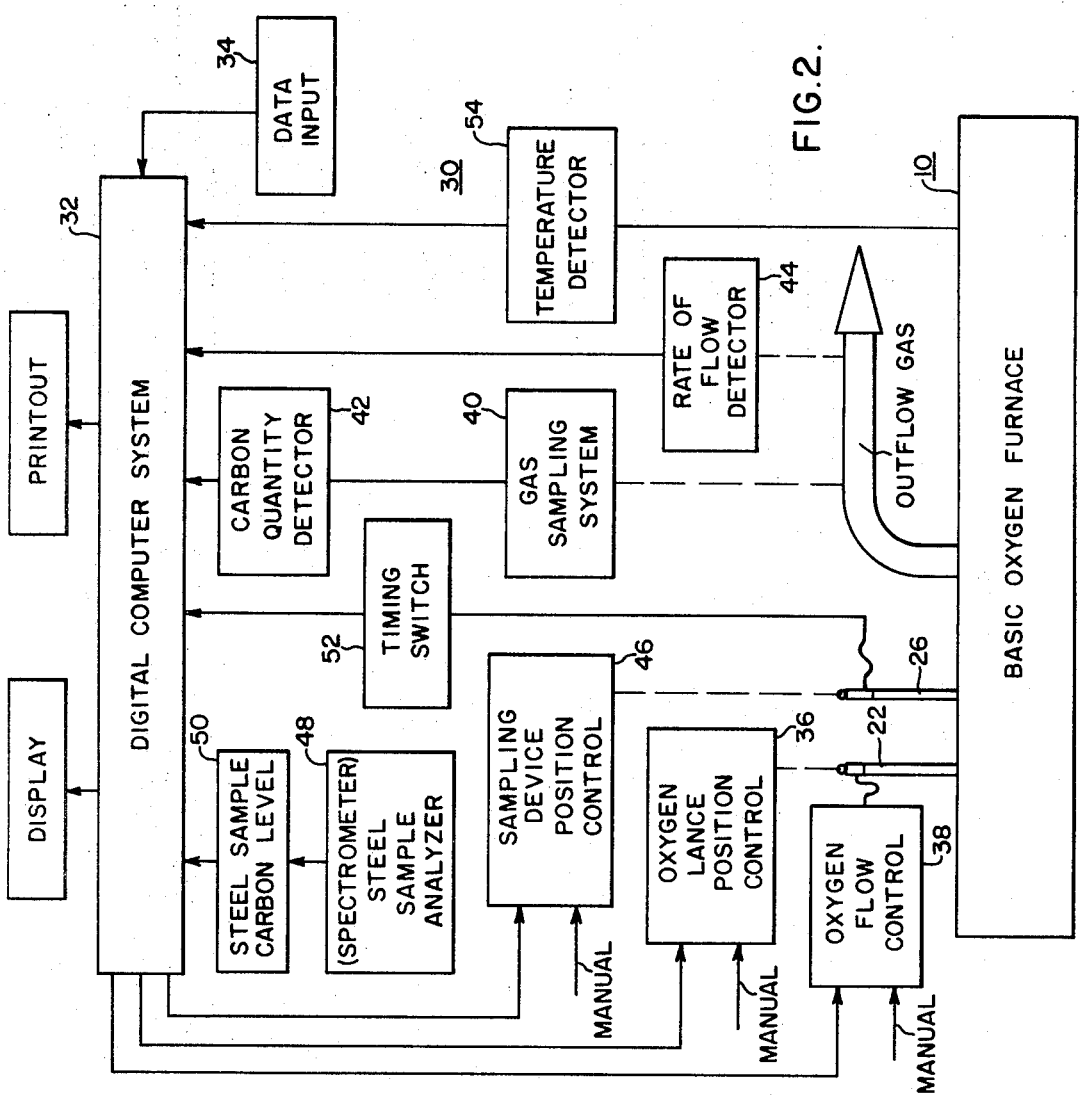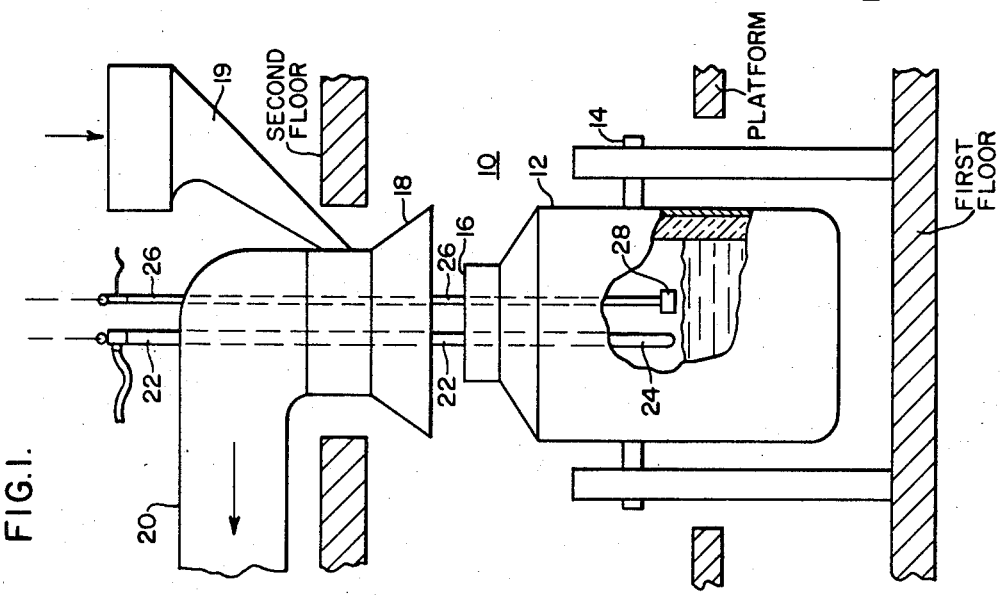

3,565,606
METHOD FOR CONTROLLING CARBON REMOVAL IN A BASIC OXYGEN FURNACE
Norman R. Carlson, Export, Richard E. J. Putman, Penn Hills, and James T. Carleton, Pittsburgh, Pa., assignors to Westinghouse Electric Corporation, Pittsburgh, Pa., a corporation of Pennsylvania
Filed June 27, 1967, Ser. No. 649,236
Int. Cl. C21c 5/32
U.S. Cl. 75—60        6 Claims

ABSTRACT OF THE DISCLOSURE

Both low and high carbon steels are produced in a basic oxygen furnace controlled by a system which employs a direct sampler operated at an adequately early predetermined time during the oxygen blow. Endpoint carbon level is controlled as a result of calculations made from the sample carbon level and waste gas measurements of post sample time carbon removal. The carbon control is made compatible with other endpoint controls.

CROSS REFERENCE TO RELATED APPLICATIONS

Reference is made to the following copending applications assigned to the present assignee:

(1) Ser. No. 649,235, now Patent No. 3,503,259, entitled A Direct Sampler Adapted for Use in a Basic Oxygen Furnace, filed by J. T. Carleton, N. R. Carlson and R. E. J. Putman on June 27, 1967;

(2) Ser. No. 649,231 entitled Improved System and Method for Controlling Phosphorus Removal in a Basic Oxygen Furnace, filed by N. R. Carlson on June 27, 1967.

BACKGROUND OF THE INVENTION

In the basic oxygen steelmaking process, a lance is controllably positioned to feed a controlled amount of oxygen into the basic oxygen vessel principally for the purpose of heating and decarburizing the metal bath. Since carbon level significantly affects the properties of steel product, it is necessary that the carbon level of steel made in a basic oxygen furnace (BOF) be controlled as in the case of other types of steelmaking furnaces and further that the carbon control be compatible with other BOF controls such as an end-point temperature control placed on the bath. By the term carbon level, it is meant herein to refer to the weight percentage of carbon in a quantity of steel. By the term carbon content, it is meant herein to refer to the weight of carbon in a quantity of steel. When the weight of a quantity of steel is known, the carbon content can readily be determined from the carbon level and vice versa.

In commercial practice, it is desirable that carbon control be effective during the BOF steelmaking process to produce specified carbon level steel accurately at the process endpoint. By the terminology process endpoint, it is herein intended to refer to a point in time just prior to vessel turndown. Present practice typically requires turning the vessel down to its test position after the oxygen blow and spoon sampling the bath and subsequently taking post endpoint procedures such as carbocoke adding or renewed oxygen blowing which may be used to correct a low or high bath carbon level. The extent to which post process endpoint correction is required depends on the character of the carbon control itself as well as any special circumstances which may have affected the effectiveness of the carbon control as operated for a particular heat. With efficient in process carbon control, post process endpoint carbon correction is minimized or eliminated and maximum furnace utilization and productivity is made possible in the fast BOF steelmaking process.

As disclosed in U.S. Patent 3,181,343 entitled Method and Arrangement for Measuring Continuously the Change of the Carbon Content of a bath of molten metal and issued to J. D. Fillon on May 4, 1965, one means for effecting carbon control is to collect the process waste gas in a hood over the BOF vessel and then determine the amount of carbon contained in the outflow gas since it is known that the carbon in the gaseous products of the vessel reactions is substantially equal to the carbon removed from the steel bath by the oxygen blow. Typically, the waste gas flow rate and the instantaneous carbon level of a sample flow are determined before the waste gas is depolluted and released to the atmosphere.

The total gaseous carbon outflow in any selected time interval is calculated by integration of the instantaneous gaseous carbon outflow rate over the time interval. The carbon integration is normally started when the oxygen blow is initiated, and the integral is substracted from an estimated initial carbon content of the steel bath to provide updated bath carbon content values subject to a measurement delay (usually about 40 seconds). When the estimated residual carbon in the bath reaches the specified value, the oxygen blow and the decarburizing reaction are substantially simultaneously terminated.

Another carbon control method is the oxygen balance technique. In this approach, a calculation is made of the total oxygen required to oxidize predetermined quantities of carbon, silicon, manganese, phosphorus, sulfur and slag in the bath. The oxygen blow is terminated when the total blown oxygen equals the calculated value.

Both of the foregoing methods are characterized with endpoint carbon accuracy problems since both depend upon an initial and often relatively inaccurate estimate of carbon content in the steel bath. The accuracy of the initial carbon estimate is adversely affected by factors including: (1) scrap of unknown carbon content is usually charged in the BOF vessel; (2) it is typically difficult to obtain a meaningful sample of molten iron for chemical analysis before the iron is poured from the ladle into the BOF vessel; (3) during pouring of the molten iron, an unknown quantity of carbon is lost in graphitic or other form.

One recently developed BOF process improvement for low carbon heats involves an emiprically determined dynamic relationship between the bath carbon removal rate and the bath carbon level. Generally, under controlled oxygen blow conditions, the carbon removal rate tends to be constant until the carbon level has dropped to or near a predetermined value such as about 45 points (45% C). Carbon removal then characteristically decelerates, that is the carbon removal rate decreases.

From the dynamic carbon level removal rate relationship, the bath carbon level is relatively accurately determined independently of the initial carbon estimate during the decelerating part of the decarburizing process and the specified endpoint carbon level is usually reached with substantially improved accuracy. However, the dynamic control is characterized with decreasing accuracy with increasing endpoint carbon level specifications. Further, endpoint carbon control above 25 points is virtually impossible because of restrictions imposed by the carbon level location of the knee of the carbon removal rate curve in combination with the time delay associated with waste gas measurements. Accordingly, although the dynamic control method can in general produce more accurate low carbon steels than can the initial carbon estimate methods, none of these methods are adaptable to reliable production of relatively accurate higher carbon steels such as structurals (about 30 points C or more) or railing (about 100 points C or more).

SUMMARY OF THE INVENTION

In according with the broad principles of the present invention, an improved BOF carbon control system includes means for detecting the amount and rate of carbon removed in the form of gaseous products from the bath in a BOF vessel during oxygen blow and means for computing bath carbon content and if desired other process variables from the carbon removal and other input data. A direct sampler is operated preferably during the decarburizing oxygen blow at an adaquately early sampling time point to produce a sample for analysis.

On the basis of the sampling time and the sample carbon level data, the computing means makes predetermined calculations for highly accurate bath carbon removal control. When the bath carbon level reaches the specified value within a wide range of selectable values including low and high carbon values, the decarburizing oxygen blow is terminated unless endpoint temperature or other endpoint conditions require its continuance.

It is therefore an object of the invention to provide a novel method and system for controlling carbon removal in a BOF with improved efficiency and productivity.

It is another object of the invention to provide a novel method and system for controlling carbon removal in a BOF with improved accuracy in reaching specified low and/or high endpoint carbon levels.

It is a further object of the invention to provide a novel method and system for controlling carbon removal in a BOF so that steel of specified carbon level is accurately produced normally without requiring time consuming process endpoint bath sampling and post process endpoint correction procedures after vessel turndown.

It is an additional object of the invention to provide a novel method and system for controlling carbon removal in a BOF so that specified low or high endpoint carbon level can be accurately reached simultaneously with specified endpoint bath temperature.

It is another object of the invention to provide a novel method and system for controlling carbon removal in a BOF in an accurate and efficient manner which is compatible with other BOF process controls.

These and other objects of the invention will become more apparent upon consideration of the following detailed description along with the attached drawings.

BRIEF DESCRIPTION OF THE DRAWINGS

FIG. 1 shows a basic oxygen furnace with an oxygen lance and a direct sampler provided therein; and FIG. 2 shows a BOF control system arranged in accordance with the principles of the invention.

DESCRIPTION OF THE PREFERRED EMBODIMENT

More specifically, there is shown in FIG. 1 a basic oxygen furnace 10 including a refractory lined vessel 12 which is trunnion supported for rotation from the illustrated vertical position to various inclined positions or the horizontal position about a reference axis 14. When the vessel 12 is to be charged at the startup of a heat, it is tilted to a predetermined extent and scrap metal scheduled for the heat is placed therein. Next, a preselected amount of molten iron is poured from a ladle through a mouth 16 of the vessel 12.

Considerations of thermochemical balance enter into choosing the ratio of scrap to molten metal to be used in charging the BOF 10. In a typical case, the total charge might be about 66% hot metal and about 28% scrap. In this manner, conditions are established which enable the bath to be controlled more easily to reach the specified endpoint chemistry and endpoint temperature at the same time. Basic slag forming materials such as lime as well as other preselected materials are usually placed in the vessel 12 just after it has been uprighted and the oxygen blow has been started. Charge calculation duties would normally be assigned to the computer.

When the vessel 12 is charged and located in its upright position, it is disposed under a hood 18 which acts as a collecting agent for gases emitted from the interior of the vessel 12 during processing of the bath. A suitable clearance such as a foot or so is provided for vessel rotation relative to the hood 18. Collected gases are directed through ducting 20 or the like for eventual discharge to the atmosphere. Instrumentation for the outflow gases is appropriately mounted in relation to the gas outflow path.

An oxygen lance 22, cooled by water or other coolant flow in a conventional lance coolant system, is disposed for vertical movement through the hood 18 so that the lance tip 24 can be disposed at various vertical positions within the vessel 12. A conventional cable hoist operated by a motor driven drum and a positioning control system (not indicated in FIG. 1) are provided for raising and lowering the oxygen lance 22.

Present BOF operating practice includes positioning the oxygen lance tip 24 about 5 feet or so above the quiescent slag surface during full blow conditions in order to produce a direct decarburizing oxygen supply at a predetermined rate (such as 25,000 cubic feet per minute per 350 tons of bath). Simultaneously, other elements such as silicon, phosphorus, manganese and sulfur are oxidized and removed by accumulation in the slag or by gas outflow. The total processing time from charging to the process endpoint typically would be about 25 minutes.

When a soft blow is to be effected for some predetermined purpose, the oxygen flow is materially cut back and the lance tip 24 may be placed at the full blow position but it is usually raised to some higher position. For example, if it is desired to increase the amount of iron oxide in the slag, the oxygen flow would be cut back and the lance tip 24 would be placed at a predetermined soft blow position between the slag surface and the vessel mouth 16 where it creates a swirling oxygen atmosphere above the bath. The quantity of oxygen flow in any particular lance position is controlled as described in connection with FIG. 2.

In the full blow lance operation, direct decarburization occurs as already indicated. In soft blow or raised lance operation, decarburization can occur indirectly. In any case, the terminology decarburizing oxygen blow is herein intended to include the full blow and other blow operations in which direct decarburization occurs. Indirect decarburizing blows such as slag building soft blows or slag building high lance-full flow blows are thus excluded from the definition.

There is also included in the BOF 10 a secondary lance or a direct sampler lance 26 which is operated through the hood 18 in accordance with the principles of the present invention by a cable hoist from a motor driven drum and a positioning control (not indicated in FIG. 1). A sampler tip 28 of the sample lance 26 is controllably positioned at an appropriate location within the bath where an in process sample of the molten metal is obtained at a predetermined process time point and quickly withdrawn for analysis. In this manner, a bath carbon content or level determination can be directly made as opposed to the indirect determination made from analysis of outflow gases through the hood 18. Further, the direct carbon determination can be and preferably is made during full oxygen blow conditions to provide a basis for accurate endpoint control of the steel heat and maximized productivity.

To function as described, the sampler lance 26 must be operable to withstand a flaming atmosphere temperature of 3500° F. or more and immersion in molten slag and molten steel at about 2900° F. for a period as great as one-half minute or more. Operability requires that the sampler lance 26 be withdrawn intact and that a withdrawn sample contained in the sampler tip 28 be solidified without oxidation. A sampler lance and sampler tip or device adequate for the purposes described is disclosed in the previously referenced BOF sampler copending application. Other suitable sampler lances and devices can also be employed if desired.

In FIG. 2 there is shown a control system 30 arranged to operate the BOF 10 with accurate endpoint carbon control in accordance with the principles of the invention. It includes a conventional digital computer system 32 which is provided with a programming system adapted to provide the data processing required for controlled operation of the BOF 10. Suitable display and print out equipment is provided as indicated, and data input equipment 34 including for example a teletypewriter is provided for manual entry of data as required.

Prior to charging the BOF vessel 12, an estimate is made of the initial carbon content of at least the molten metal to be processed and the estimate is placed in the computer memory. Usual estimating calculation procedures are employed, including for example the taking of a sample of the molten iron, analyzing the iron sample for carbon level, determining the total weight of the molten iron, and computing the result from the sample and weight data. When a scrap estimate procedure is employed, the scrap carbon estimate is added to the molten iron carbon estimate.

After furnace charging, the oxygen lance 22 is lowered to its full blow position under the control of a position control 36. Start and stop oxygen lance operation and position setpoint control for the position control 36 is provided by the digital computer system 32, or these controls can be provided manually as indicated. An oxygen flow control 38 regulates the rate at which oxygen flows through the lance 22, and it is also controlled by the digital computer system 32, or if desired by manual operation as indicated.

When the oxygen lance 22 starts full blow decarburizing operation, the carbon integration is begun. Shortly thereafter, any additional charge materials are entered into the vessel 12 from a hopper 19.

A conventional gas sampling system 40 draws a sample flow from the outflow gas stream and a conventional carbon detector 42 operates on the sample flow to indicate continuously the instantaneous sample carbon level for entry into the computer system 32. Another conventional detector 44 employing a suitable stack mounted orifice plate or other means continuously determines the flow rate of the outflow gas for computer entry. The computer system 32 processes the sample carbon level and flow rate data to calculate the carbon integral with a suitable deduction made for aspirant air flowing into the hood 18. The programming system ordinarily would provide for the integration to be updated periodically, such as every five seconds.

Since the carbon integral equals the amount of carbon removed from the metal bath, subtraction of the carbon integral from the estimated initial carbon content provides an updated estimate of the bath carbon content. However, the time at which the updated estimate is determined occurs subsequently to the process time point to which the estimate applies. The time delay is due principally to the time involved in collecting, sampling and measuring the waste gases. As already indicated the measurement time delay typically is about 40 seconds. Thus, a current estimate of the bath carbon content is obtained by subtracting from the updated estimate a predicted amount of carbon removed during a time period equal to the measurement time delay at the carbon removal rate characteristic of the time part of the process involved.

When the bath carbon content or level estimate reaches a predetermined value, a steel sample is obtained from the bath by operation of the direct sampler lance 26 preferably during the continuation of the full decarburizing oxygen blow operation of the oxygen lance 22. A sampler position control 46 is operated by the computer system 32 for start and stop functions and for the establishment of position setpoints. The position control 46 can also be operated manually as indicated.

As soon as the steel sample is obtained, it is withdrawn from the BOF vessel 12 by raising the sampler lance 26 through the hood 18. The sample is then placed in an analyzer 48, such as a spectrometer or a Leco analyzer, and a carbon level analog signal is developed and entered into the computer as indicated by the reference character 50. In other cases, the results of analysis may be visually determined and manually entered into the computer through the data input 34.

The point in time at which the bath sampling is made is adequately early in the decarburizing oxygen blow to allow time for analysis of the sample, processing of the sample results, and initiation and completion of control actions which might be required before the process endpoint. In a typical BOF process, the full oxygen blow is continuously maintained until the carbon endpoint is reached. Under continuous full blow operation, about 90 carbon points are removed per five minutes of full oxygen blow when the bath carbon level is above the knee of the previously mentioned carbon removal rate curve. Since a time period of about five minutes between bath sampling and the estimated carbon endpoint time is ordinarily more than adequate to meet the process control needs, the bath sampling time can be and, where simplified programming is desired, preferably is fixed to correspond to the point in time at which the estimated bath carbon content is a fixed number of points (such as 90 points) above the specified endpoint carbon level.

Generally, however, there is an allowable time range during which the sample can be taken to provide timely results for process control, and the computer can therefore be programmed with a fixed sampling time as just indicated or it can be programmed in accordance with preselected constraints and rules which define the point in time at which the bath sample is drawn within the allowed time period. In any case, the sample time point definition is preferably somewhat conservatively drafted thereby allowing for possible over-estimation of initial carbon content.

If the oxygen flow rate or the oxygen lance position is varied for some control purpose or other reason during the decarburization of the bath by the lance 22, the decarburization process is slowed down or interrupted. The computer can be programmed to take such effects into account automatically in defining the sampling time point.

At the instant the steel sample is drawn by the sampler lance 26, a timing switch 52 is operated to provide an accurate definition of the sampling time point for the computer. The switch 52 can be actuated by the closing of two contacts included in the sampler lance tip 28 as indicated in the aforementioned BOF sampler copending application.

The carbon integration is restarted at the sampling time point, and, with the steel sample carbon level data entered into the computer, the bath carbon content is thereafter accurately determined by the subtraction of the new carbon integral from the bath carbon content at the sampling time. When the calculated bath carbon content or level (including the allowance for measurement time delay) reaches the specified endpoint value, the decarburizing oxygen blow is terminated.

Endpoint temperature control is made compatibly with the endpoint carbon control described herein. For example, a detector 54 such as a device known in the trade as a bomb thermocouple can be dropped into the metal bath to produce a real temperature reading for computer entry at a process time point during the oxygen blow corresponding to that at which the bath is about 27 carbon points above its specified endpoint carbon level. This point in time is selected since it allows ample time for insertion of coolant such as scrap if it is required prior to termination of the decarburizing oxygen blow.

The programmed computer calculates the expected bath temperature rise during the continuation of the decarburizing oxygen blow up to the carbon endpoint time projected from the post sampling carbon content calculation. If the projected endpoint temperature is too high, a demand for coolant is signalled and scrap or other coolant is entered into the BOF vessel 12 in the required amount. If the projected endpoint temperature is too low, it is then necessary to provide decarburizing or soft oxygen blow beyond the carbon endpoint until the endpoint temperature is reached. The heat can then be accepted at the resulting carbon level, or partial or full correction of a resulting low carbon heat can be made by introduction of carbocoke or the like into the molten metal when it is tapped into a ladle.

Any other required additives such as ferromanganese, aluminum or ferrophosphorus are also added at tapping. If a sampler lance 26 similar to that described in the aforementioned copending BOF sampler application is employed, the actual bath temperature reading to be used for predicting the endpoint temperature can be obtained by the sampler lance 26 at the bath sampling time point and the described bomb thermocouple procedure is eliminated.

By use of the control system and method of the invention, accurate carbon endpoint levels are realized for low and/or high carbon BOF heats prior to process endpoint thereby effecting improved efficiency and productivity. Sole reliance on estimated initial carbon contents in controlling the BOF process is eliminated since an accurate in process bath carbon content reference point is established through the controlled operation of the sampler lance 26.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A method for controlling the operation of a basic oxygen furnace comprising the steps of determining a sampling time point prior to the process endpoint and during the time period covered by a decarburizing oxygen blow, obtaining a bath sample from the BOF vessel substantially at the determined time point, analyzing the bath sample for its carbon level, operating a computer to calculate the bath carbon content at the sampling time point on the basis of the sample carbon analysis, operating the computer to make a post sampling carbon removal calculation based on predetermined waste gas measurements and a starting time equal to the sampling time point, operating the computer to calculate bath carbon content on the basis of the post sampling carbon removal calculation and the bath carbon content at the sampling time point, and terminating the decarburizing oxygen blow when the post sampling bath carbon content calculation indicates a specified endpoint carbon level is reached unless predetermined conditions direct otherwise.

2. A method for controlling the operation of a basic oxygen furnace as set forth in claim 1 wherein there are further included the steps of operating the computer with the use of predetermined data to estimate the initial carbon content of at least the iron component of bath material with which the furnace is charged, operating the computer to make a carbon removal calculation based on waste gas measurements during decarburizing oxygen blow operation prior to the sampling time point, operating the computer to calculate estimated bath carbon content from the estimated initial carbon content and the pre-sampling carbon removal calculation, and operating the computer to determine the sampling time point on the basis of a predetermined relation between the estimated bath carbon content calculation and the specified endpoint carbon level.

3. A method for controlling the operation of a basic oxygen furnace as set forth in claim 1 wherein there are further included the steps of making a temperature reading of the bath at a predetermined process time point during the time period covered by the decarburizing oxygen blow, operating the computer to calculate the predicted bath endpoint temperature on the basis of the temperature reading and the post sampling carbon content calculation, and taking any required temperature corrective action before the process endpoint.

4. A method for controlling the operation of a basic oxygen furnace as set forth in claim 2 wherein there are further included the steps of operating the computer to add a predetermined number of carbon points to the specified points of the endpoint carbon level, and obtaining the bath sample when the estimated carbon content calculation reaches a value corresponding to the results of the immediately foregoing addition step.

5. A programmed method for operating a BOF digital computer system, said method comprising the computer operating steps of calculating the bath carbon content from the carbon level in a bath sample taken at a predetermined point in time during the oxygen blow, calculating post sampling carbon removal on the basis of predetermined waste gas measurements and a starting time equal to the sampling time point, calculating bath carbon content on the basis of the post sampling carbon removal calculation and the bath carbon content at the sampling time point, and determining when the post sampling bath carbon content calculation indicates a specified endpoint carbon level is reached.

6. A programmed BOF computer operating method as set forth in claim 5 wherein there are further included the steps of using predetermined data to estimate the initial carbon content of at least the iron component of bath material with which the furnace is charged, calculating carbon removal from waste gas measurements during decarburizing oxygen blow operation prior to the sampling time point, estimating bath carbon content from the estimated initial carbon content and the pre-sampling carbon removal calculation and determining the sampling time point on the basis of a predetermined relation between the estimated bath carbon content calculation and the specified endpoint carbon level.

References Cited

UNITED STATES PATENTS

| | | | |
|---|---|---|---|
| 3,161,499 | 12/1964 | Percy | 75—60 |
| 3,181,343 | 5/1965 | Fillon | 73—23 |
| 3,236,630 | 2/1966 | Stephan | 75—60 |
| 3,329,495 | 7/1967 | Ohta et al. | 75—60 |
| 3,372,023 | 3/1968 | Krainer et al. | 75—60 |
| 3,450,867 | 6/1969 | Blum et al. | 75—60X |
| 3,463,005 | 8/1969 | Hance | 73—425.4X |
| 3,475,599 | 10/1969 | Schwartzenberg et al. | 75—60X |

FOREIGN PATENTS

| | | | |
|---|---|---|---|
| 989,993 | 4/1965 | Great Britain | 75—60 |

OTHER REFERENCES

Philbrook et al., Basic Open Hearth Steelmaking, AIME, 1951, pps. 309–313.

Wilson, Continuous Carbon Analysis for the Open Hearth Steelmaking Process, Journal of the Metals, vol. 18, No. 4, April 1966, pps. 491–94.

L. DEWAYNE RUTLEDGE, Primary Examiner

G. K. WHITE, Assistant Examiner

U.S. Cl. X.R.

73—425.4; 235—151.1